United States Patent
Rabotin et al.

(10) Patent No.: US 10,318,869 B2
(45) Date of Patent: Jun. 11, 2019

(54) DECISION-MAKING PROCESS FOR ELEMENTS IN A DISTRIBUTED NETWORK

(71) Applicant: AIRBUS DS SAS, Elancourt (FR)

(72) Inventors: Christopher Rabotin, Saint Gratien (FR); Fabien Valverde, Les Clayes sous Bois (FR)

(73) Assignee: AIRBUS DS SAS, Elancourt (FR)

( * ) Notice: Subject to any disclaimer, the term of this patent is extended or adjusted under 35 U.S.C. 154(b) by 985 days.

(21) Appl. No.: 14/760,252

(22) PCT Filed: Jan. 7, 2014

(86) PCT No.: PCT/EP2014/000014
§ 371 (c)(1),
(2) Date: Sep. 25, 2015

(87) PCT Pub. No.: WO2014/108325
PCT Pub. Date: Jul. 17, 2014

(65) Prior Publication Data
US 2016/0063374 A1 Mar. 3, 2016

(30) Foreign Application Priority Data
Jan. 10, 2013 (FR) .................... 13 50212

(51) Int. Cl.
*G06N 5/02* (2006.01)
*G06N 7/00* (2006.01)

(52) U.S. Cl.
CPC ............... *G06N 5/02* (2013.01); *G06N 7/005* (2013.01)

(58) Field of Classification Search
None
See application file for complete search history.

(56) References Cited

U.S. PATENT DOCUMENTS

| 2006/0021023 | A1 | 1/2006 | Stewart et al. | |
| 2009/0240516 | A1* | 9/2009 | Palestrant | G06Q 10/10 705/346 |
| 2014/0075004 | A1* | 3/2014 | Van Dusen | H04L 41/04 709/223 |
| 2014/0337448 | A1* | 11/2014 | Kline | H04W 4/12 709/206 |
| 2016/0103588 | A1* | 4/2016 | Adarraga | H04L 65/403 715/733 |

OTHER PUBLICATIONS

International Search Report as issued in International Patent Application No. PCT/EP2014/000014, dated Mar. 31, 2014.

* cited by examiner

*Primary Examiner* — Alan Chen
(74) *Attorney, Agent, or Firm* — Pillsbury Winthrop Shaw Pittman LLP

(57) ABSTRACT

A decision-making process is implemented by a decider processing unit. The decision-making process includes the propagation of a proposition in a distributed network of processing units, with each processing unit being provided with decision intelligence.

11 Claims, 5 Drawing Sheets

DECISION-MAKING PROCESS FOR ELEMENTS IN A DISTRIBUTED NETWORK

CROSS-REFERENCE TO RELATED APPLICATIONS

This is the U.S. National Stage of PCT/EP2014/000014, filed Jan. 7, 2014, which in turn claims priority to French Patent Application No. 1350212, filed Jan. 10, 2013, the entire contents of all applications are incorporated herein by reference in their entireties.

This invention relates to a process for making decisions by a so-called decider processing unit, by propagation of a proposition in a distributed network of processing units, each processing unit being provided with decision intelligence. Decision intelligence means a hardware and software capacity for implementing a decision process.

The invention can apply to any system that is not autonomous, entirely or semi-autonomous.

In an autonomous network, there are three possible ways to organise decision making. In FIG. 1 according to prior art, the node A is considered as a supervisor and communicates with each node B over the transport network (TN1) (dashed lines). The nodes B1 to B3 are on the same hierarchical level and can communicate with each other over an independent transport network: the transport network 2 (TN2) (dotted lines).

Three types of decision-making algorithms are generally distinguished.

Centralised Algorithm

In this case, the supervisor A makes the decisions for any request from B1, B2 or B3. For an optimum decision, A is aware of all of the information concerning the environment of the nodes B. A centralised algorithm operates in the following way:

1) Periodically, B sends all of the information available on TN1 to A;
2) If B needs a decision to be made, B implements the following steps:
   a) requesting that a decision be made by A,
   b) waiting for A to calculate a solution,
   c) receiving and applying the solution from A.

Implementing a centralised algorithm has the following advantages:

The supervisor A is fully aware of the network environment of all of its child nodes B.

The nodes B can be very simple machines as they require very little calculating power.

Likewise the implementing of a centralised algorithm has the following disadvantages:

The decision depends on the stability of the network TN1: if the transport network TN1 is defective, any node B that needs a decision has to wait until TN1 is operational and that the response from A can be received. If this decision is critical, the network, as a whole, can break down.

According to the sending period by B of the information required to make the decision as well as the propagation time of the response: the decision made by A may be obsolete.

If several nodes B request a decision at the same time, there may be an overload or congestion of the node A due to the fact of receiving and/or of calculating the environmental parameters for several nodes B.

As the updating of all of the environmental parameters of each node B is periodical at the level of the supervisor A, there is a large amount of signalling, therefore a substantial load, over the network directly linked to the supervision of A.

Distributed Algorithm

In a distributed algorithm, the notion of supervisor A does not exist.

All information relating to decision making transits by the transport network TN2.

An embodiment can be:

If B1 has to make a decision:
1) B1 calculates a possible solution
2) B1 consults B2 and B3 in order to know if the proposed solution is viable with regards to the environment of B2 and B3:
   a) if B2 and B3 agree, B1 applies the proposed solution
   b) if one or both of them do not agree, move to step 1) or the end of the process.

"End of process" means that the solution proposed by B1 is retained.

Implementing a distributed algorithm has the following advantages:

little signalling, therefore a low load for any decision-making process.

The decisions are not obsolete when they are made.

The "low load" due to limited signalling means that there are few messages exchanged compared to the centralised algorithm wherein A periodically receives the environment parameters from all of the nodes B.

Implementing a distributed algorithm has the following disadvantages:

The decision depends on the stability of the network TN2: if this transport network is not operating correctly, an incorrect decision can be made.

The nodes B1 to B3 have to be able to calculate decisions and implement algorithms.

Hybrid Algorithm

A hybrid algorithm makes it possible to combine the advantages of the two preceding methods. In the case of a hybrid algorithm, certain decisions can be made by the supervisor node A, while other decisions can be made exclusively by the nodes B. An embodiment of a hybrid algorithm can be the following:

If B1 has to make a decision:
1) If the decision has to be calculated in a central manner:
   a) See the centralised algorithm hereinabove.
2) Otherwise, if the decision has to follow a distributed calculation algorithm:
   a) See the distributed algorithm hereinabove. Implementing a hybrid algorithm has the following advantages:

little signalling if a limited number of decisions are centralised or if the centralised decision requires few environmental parameters.

The decisions based on distributed algorithms are not obsolete.

The supervisor A is partially aware of the network environment of its child nodes B.

According to the case, the decision to be taken can be independent from one or the other transport network.

Implementing a hybrid algorithm has the following disadvantages:

The nodes A and B have to be able to calculate decisions and implement algorithms.

According to the sending period by B of the information required to make the decision as well as the propagation time of the response: the decision made by A can be obsolete.

According to the case, the decision to be made can be dependent on one or the other transport network TN1 or TN2.

The document "Weighted Voting for Replicated Data", 1979, of David K. Gifford is known, which proposes the use of a vote process influenced by a quorum in order to determine how data are to be replicated in the distributed systems. However, the algorithm proposed by Gifford is not versatile, modular or hybrid. Indeed, Gifford proposed an algorithm for maintaining the replicated files to be used in distributed computer networks.

This invention has for purpose a new decision-making method that uses the quorum principle.

Another purpose of the invention is the implementation of a new decision-making process based on an improved, versatile and modular hybrid algorithm.

At least one of the aforementioned objectives is achieved with a decision-making process by a so-called decider processing unit, by propagation of a proposition in a distributed network of processing units, each processing unit being provided with decision intelligence.

According to the invention, the following steps are carried out:

a) the decider determines a proposition upon reception of a request, b) a set of so-called voter processing units is selected, able to analyse the proposition and present a response, with this response comprising a confirmation of the proposition or a denial of the proposition, c) a percentage weighting for each voter or group of voters selected as such is defined, d) a confirmation threshold as a percentage starting from which the proposition is considered as confirmed is defined, e) a denial threshold as a percentage starting from which the proposition is considered as denied is defined, f) a timer is triggered and at least one processing time is defined, g) said proposition with the processing time is transmitted via the distributed network to all of the voters, h) during the processing time, according to the responses that it receives, the decider determines the confirmation response percentage and the denial response percentage, then confirms or denies the proposition by comparing the percentages determined as such with the confirmation and denial thresholds; at the end of the processing time, if no decision has been made, the decider retrieves all of the available responses and determines the confirmation response percentage and the denial response percentage, then confirms or denies the proposition by comparing the percentages determined as such with the confirmation and denial thresholds.

With the method according to the invention, the decision can be centralised, distributed or hybrid according to the weighting assigned to each voter.

The method according to the invention performs better than a decision-making algorithm in hybrid mode as influence is granted to each voter. In other terms, for each decision that has to be made by a decider, a list of voters is determined. From this list, the decider defines a weighting, which is an influence of each voter on the final decision. Each voter interrogated must provide a response which can be supportive, i.e. a confirmation of the proposition emitted by the decider, or an opposition to this proposition. According to a preferred embodiment of the invention, this response can also be "no opinion", i.e. a neutral response. The response is therefore not Boolean, there are three possibilities. The neutral response makes it possible in particular to not consider in the final decision the voter that has supplied a neutral response. The influence assigned by the decider to this voter can then be distributed to all of the other voters according to their respective influence. Finally, if a sufficient number of voters have responded, the decider makes its final decision. In order to prevent an excessively slow voter from delaying the making of the final decision, a maximum duration is provided beyond which the opinion of the voters will not be taken into account. This processing time is defined by the decider then communicated to all of the voters. This allows the decision-making process implemented within the voters to calibrate the precision of their respective decisions according to the time available to them. Preferably, if a voter responds too late, its response is not taken into consideration, its response is considered as no opinion. All of the decisions are updated when they are received by the decider. It can also be provided that if a voter implements a converging algorithm in order to determine a response, at the end of the processing time that is allotted to it, it must decide even if its algorithm has not converged or send a decision in progress. Decision in progress means an intermediary decision that will be transformed into a final decision at the end of a converging algorithm.

Moreover, if a voter considers that its processing will not allow it to respond within the time allotted by the processing time, the voter can decide to not respond in order to release the bandwidth.

In order to favour the rapidity of the processing, the calculation of the result can take place as the responses arrive. When one of the thresholds is reached, it is considered that a result is available.

In order to prevent a decision being made when the number of responses is insufficient, a quorum is defined according to the nature of the decisions of the voters. In particular, a threshold is defined for the confirmation responses and another threshold for the denial responses.

The method according to this invention is both of the hybrid and weighted type, integrates a timer and does not depend on the differentiation between several transport networks.

For example a supervisor can be defined that could have full or partial knowledge of the distributed network.

According to an advantageous implementation of the invention, selecting a set of voters is carried out according to criteria relative to the proximity, nature (technical characteristics or functional capacity in particular) of each voter and/or the content of the request.

Through this selection, the method according to the invention is a method that is not only hybrid but also dynamic. Voters are distinguished not only by their hierarchical level, but also by their influence.

Advantageously, a level of priority is associated with the proposition, and the processing time is specific to this level of priority. This level of priority can be a unique identifier. For example, the following four priorities can be defined:

1) Critical
2) High
3) Normal
4) Low

This makes it possible to prioritise and date the propositions so that the most important propositions are taken into account rapidly.

According to an advantageous characteristic of the invention, at least one voter, which is a processing unit selected individually or within a group of voters, can be configured to apply the steps a) to h) hereinabove to other so-called secondary processing units by considering the same proposition.

In other terms, a voter can autonomously consider that it has in turn to have the opinion of other processing units for the same proposition. This is what is referred to as the propagation of the decision of the quorum. The propagated proposition have a priority that if possible is higher than the original proposition, or is assigned a processing time that is shorter, in such a way that this voter can respond within the time that is allotted to it. Consequently, the proposition subjected to said secondary processing units is assigned a level of priority that is higher or equal to the level of priority assigned to the proposition and determined by the decider.

According to an advantageous characteristic of the invention, the distributed network can be a homogeneous network or a heterogeneous network.

Advantageously, all of the processing units of the distributed network can be of identical hierarchical levels or of different hierarchical levels.

According to another aspect of the invention, a system is proposed comprising a plurality of processing units provided with decision intelligence, with these processing units being connected together in a network, with each processing unit being configured as a decider in order to implement a decision-making process by propagation of a proposition in the network such as defined hereinabove.

The invention also relates to a telecommunication equipment provided with decision intelligence and connected in a network to a plurality of processing units, with this equipment being configured as a decider in order to implement a decision-making process by propagation of a proposition in the network. The decider is configured to implement a decision-making process by propagation of a proposition in the network such as defined hereinabove. This equipment can be an MME (for "Mobility Management Entity"), an eNode or an UE (for "User Equipment").

Other advantages and characteristics of the invention shall appear when examining the detailed description of an embodiment that is no way restrictive, and the annexed drawings, wherein.

In accordance with FIGS. 2 and 3, an embodiment of this invention applied to the problem of allocating identifiers of cells in a mobile telephone network in particular shall now be described. In particular, this can entail allocating a PCI ("Physical Cell Identity") identifier to an eNodeB in such a way as to avoid any problem of confusion and collision. An eNodeB is a relay in an LTE network. The PCI is a parameter required to form a radio cell. A PCI identifier is used by a user equipment (UE) in order to identify a cell. An eNodeB is connected to both the core of the network as well as to other relays.

Figure 1:
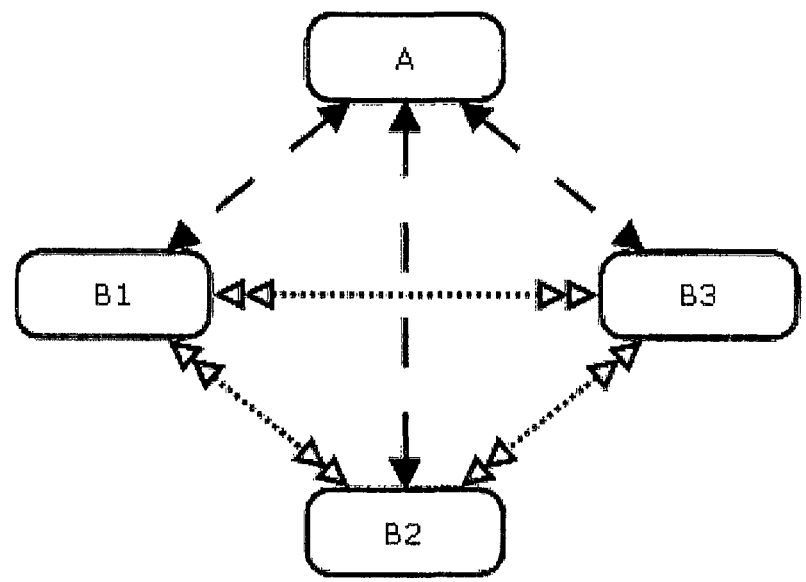
FIG. 1 is a diagrammatical view of several elements constituted in a network according to prior art.
Figure 2:
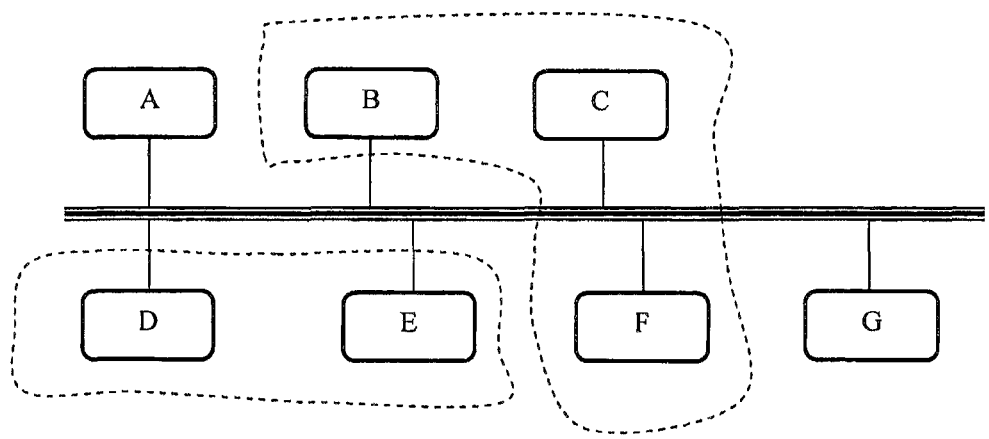
FIG. 2 is a diagrammatical view of a network of processing units A to G without distinction of the type of link between the processing units.
Figure 3:
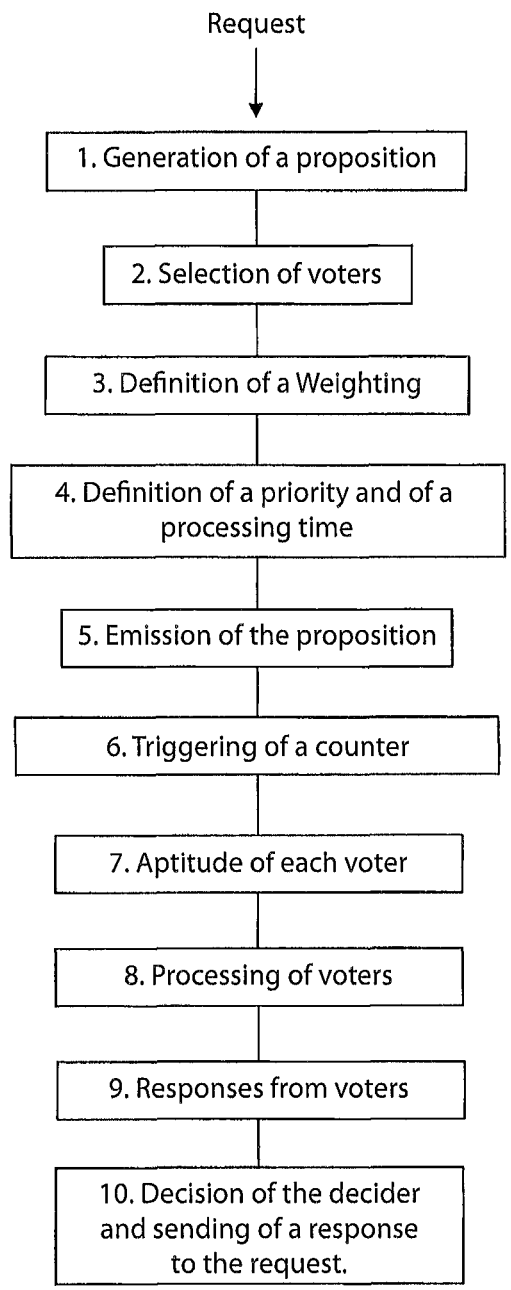
FIG. 3 is a flow chart showing various steps of the method according to the invention.

In FIG. 2, a set of equipment A, B, C, D, E, F, G is shown, integrated into a network without particular distinction of the linked between these various pieces of equipment. This can be wireless or wired physical links. With the method according to the invention, it is not necessary to designate a supervisor.

When the equipment A has to make a decision following a request, it implements a decision-making process according to the invention. The first step, as shown in FIG. 3, consists in generating a proposition. This proposition is for example a PCI number that the equipment A, the decider, wants to present as a response to said request. Before responding this, the equipment A consults the other pieces of equipment in the following way:

In the step 2, the decider selects several pieces of equipment which will be considered as voters. This selection is carried out according to the nature of the request or according to the proximity in particular of the pieces of equipment. The selection can also be random or according to a rotating principle. The selection can be preconfigured, determined using a static table or a dynamic table within the decider or in an independent processing unit or in a supervisor of the network. In the case of FIG. 2, two groups of voters are selected: a first group formed of the voters B, C and F, a second group formed of the voters E and D. G is a piece of equipment that is not selected.

In the step 3, the decider or a supervisor defines a weighting that is assigned to each group in a predetermined manner or according to the characteristics of each group of voters: for example 60% for the first group, and 40% for the second group. That is to say, more influence is granted to the first group than to the second; with the influence being a notion which is here manifested by a weighting as a percentage. The weighting for each voter or group of voters can be static (predetermined) or dynamic (varying according to the proposition, the characteristics of the voters, the reliability of the voters, a predefined rule, etc.).

A threshold can also be defined in a predetermined manner, according to the proposition and/or according to the voters. This threshold is 45% for example, for confirmation responses. That is to say that if at least 45% of the responses, taking the weightings into account, are confirmations then the proposition is considered to be confirmed. In the same way a threshold of 40% for example can be defined for the denial responses. It is interesting to define thresholds in particular due to the fact that certain pieces of equipment can have a "no opinion" response, i.e. neither confirm nor deny the proposition, which would lead to a percentage total of confirmation and denial responses less than 100%. It is however planned in the case where the two thresholds were to be reached, to give a priori the priority to the confirmation response or to the denial response, or to request a renewal of the decision-making process starting from the step 2 for example.

In the step 4, the decider determines a level of priority for the proposition generated in the step 1. This level of priority is in particular a function of the type of the request. At the same time, a processing time is defined, a "timeout" that corresponds to the maximum time allotted for this proposition. A dynamic table is considered, updated continuously, wherein all of the propositions in progress with their level of priority are listed. This table makes it possible to manage the priorities and to follow the proper adequacy between the capacity (in bandwidth) of the network and the quantity of propositions in progress. This table can be managed by a supervisor or within the decider.

In the step 5, the decider contacts the voters and generates the proposition for their attention.

In the step 6, the decider triggers a timer at the same time the proposition is sent. It also sends the processing time with the proposition.

In the step 7, each voter determines its ability to respond to the proposition.

If it considers that it can respond within the allotted time, it implements its decision-making process.

If it considers that it is not able to respond, that it has already responded to this proposition or that it cannot respond within the allotted time, it can remain silent in order to avoid congesting the network, re-emit the previous response or emit a "no opinion" response, and this according to the type of proposition or in a configured manner.

If it considers that it needs in turn an opinion from other processing units, it can in turn consult these other units, referred to as secondary, in such a way as to have an opinion on the same proposition but with a level of priority that is, if possible, higher, or equal to the level of priority of the proposition emitted by the decider; with the consultation consisting in applying the steps 2 to 7 hereinabove to these other processing units.

In the step 8, each voter implements its decision-making process and generates a response that can be: "confirmation", "denial" or "no opinion".

In the step 9, when the timer has elapsed, the decider considers the responses in progress when there are any. The responses are transmitted in real time by each voter to the decider, or the decider retrieves these responses on a regular basis or at the expiry of the allotted processing time. The decision of a group can be unique and/or a group of decisions of each voter.

In the step 10, the decider checks if for the total, the set of responses obtained makes it possible to exceed the confirmation or denial threshold, then confirms or does not confirm its proposition according to the result obtained.

The method according to the invention makes it possible to obtain a decision by quorum.

It allows for example an autonomous determination of PCI numbers and a method for correction of conflicts.

The applications of such a decision-making process by quorum comprise in particular:

the determination of PCI numbers for a new setting up of an eNodeB with and without OAM ("Operation, Administration, Maintenance") connectivity, the determination of PCI numbers with or without connection to the neighbouring eNodeB, the detection of PCI conflicts in the immediate wireless vicinity, and the correction of PCI conflicts with the minimum stoppage time by an OAM or by another eNodeB, The automatic determination of the valid PCI without the needs for a wireless terminal table based on inter-neighbour relationships, The attempts to save calls and the context of each terminal on line in order to limit problems for the terminals.

The method according to the invention is extremely reliable, versatile, can be modulated and does not depend on the quality of the transport of the network or on the load (or on the capacity of the voters to respond). The method is reliable as processing units are used that are reliable due to the weighting. Each decision is made directly or indirectly by nodes of the network that are aware of it.

In complex distributed systems, implementing such a method allows a globally correct decision to be made within the controlled processing time. A hierarchical distributed network can also be created with static or dynamic weightings of each element of the network.

Figure 4:
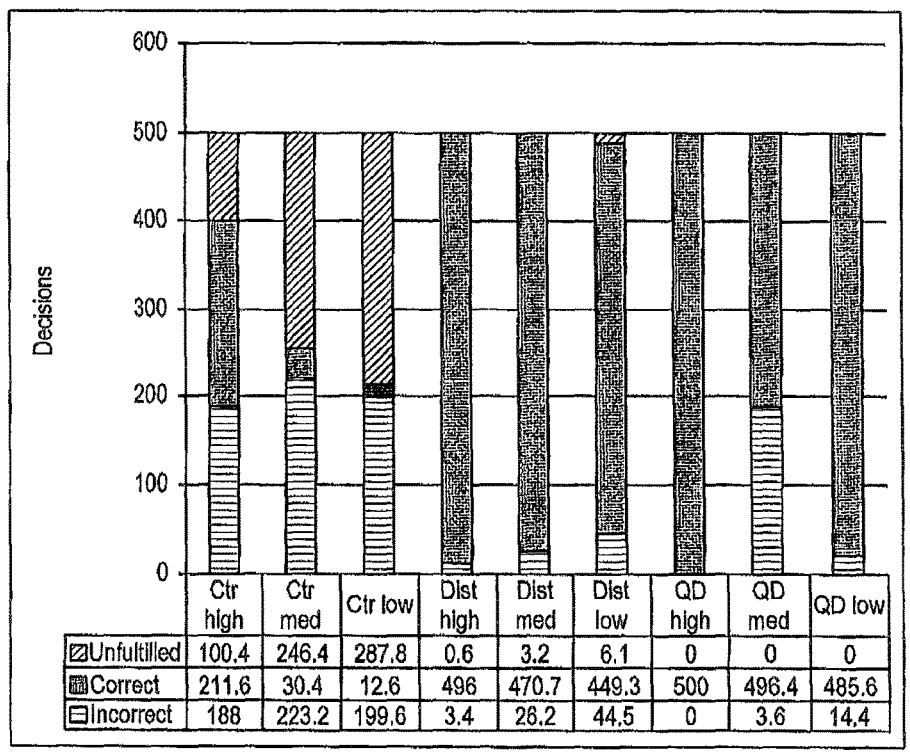
FIG. 4 is a comparative graph that shows the quality of the decision made according to the process and the quality of the network.

FIG. 4 is a comparative table between the method according to the invention and the methods according to prior art with regards to:

the precision of the decision: are the decisions approved by the voters correct according to the simulation controller?

the rapidity of the decision: what is the rapidity of determining decisions?

the latency of the determined decision: is the determined average network-value close to the actual average network-value? This determines the validity of the decision.

Using simulations, the following conclusions can be drawn on the method according to the invention:

the decisions are always obtained;

the decisions are correct for the most part, even with a network of low quality;

the decisions are calculated within the allotted time, regardless of the quality of the network;

the latency time between the calculated network-value and the actual network-value is better in relation to any other method tested (except in the case of a distributed algorithm with a high quality of the transport network) and is constant regardless of the quality of the transport network.

Even in low-quality network conditions with distributed methods or decision method by quorum according to the invention, the decisions made are almost always "good". What differentiates in the particular the decision-making process by quorum with respect to a distributed process is that the decision is made within a finite time in the decision process by quorum.

Figure 6:
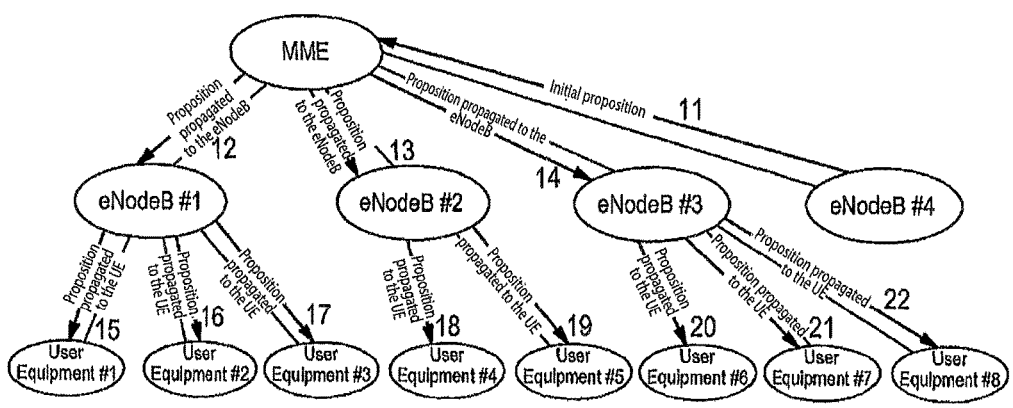
FIG. 6 is a diagrammatical view that shows the propagation of a proposition in the network of FIG. 5.
Figure 7:
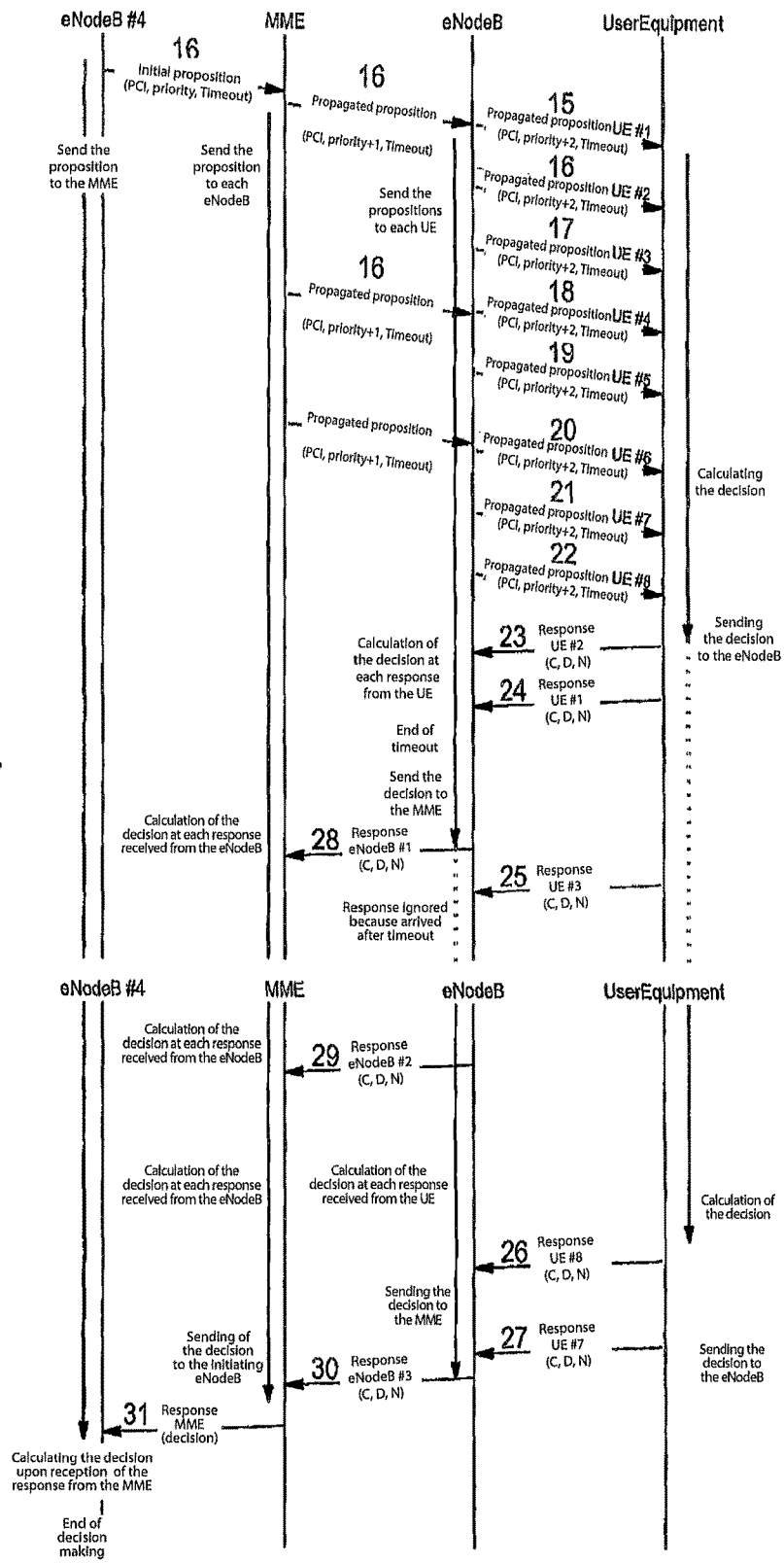
FIG. 7 is a chronological representation of the propagation of the proposition such as shown in FIG. 6.

An example of propagation of a proposition of attribution of a PCI identifier shall now be described in FIGS. 5 to 7. A network is distinguished constituted of an MME (Mobility Management Entity) entity having as a load a zone comprising three nodes eNodeB 1, eNodeB 2 and eNodeB 3. The MME entity is a supervisor of this zone. Each eNodeB is able to exchange signalling flows and media flows with several pieces of user equipment, such as mobile devices. The eNodeB 1 communicates with equipment1, equipment2 and equipment3. The eNodeB 2 communicates with equipment4 and equipment5. The eNodeB 3 communicates with equipment6, equipment7 and equipment8.

Figure 5:
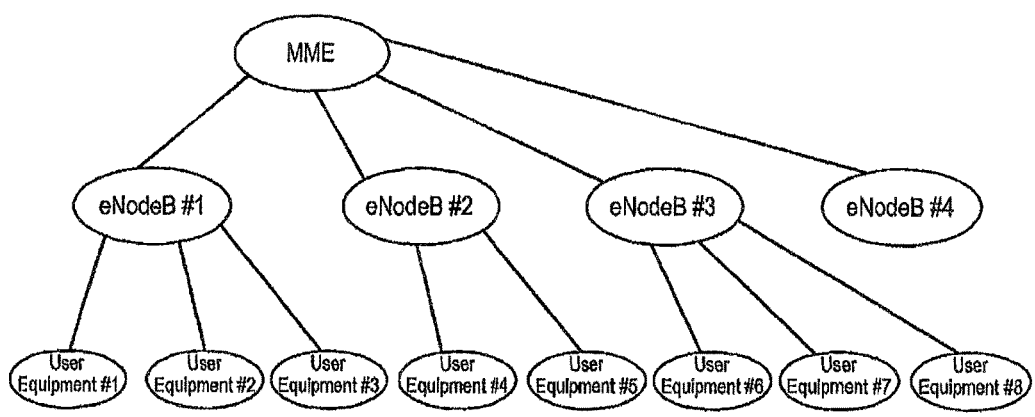
FIG. 5 is a diagrammatical view that shows a network of equipment wherein the method is implemented according to the invention for the attribution of a PCI ("Physical Cell Identity") identifier.

In FIG. 5, a new eNodeB 4 is seen that is placed in the zone managed by the MME. This eNodeB 4 is not attached to any user equipment and does not have any interface with any of the eNodeB already present in the zone. According to the invention, the eNodeB 4 is the decider and generates a proposition in the step 11, see FIGS. 5 and 6. This proposition comprises a PCI identifier that the decider eNodeB 4 proposes to acquire. To this PCI identifier, the decider associates a priority and a timer "timeout". The PCI identifier, priority and timer set is sent to the MME entity. The latter propagates, in the steps 12, 13 and 14, the proposition to the secondary processing units which are the eNodeB 1 to 3. A weighting can be applied to these different processing units. The same proposition is indeed propagated, it entails the same PCI identifier as in the step 11. In the step 12, the MME entity associates with the PCI identifier a new priority referred to as priority+1 as well as a timer "timeout1", with the whole being sent to the eNodeB 1. The same occurs in the step 13 during which the MME entity associates with the PCI identifier the priority+1 and a timer "timeout2", and transmits the set to the eNodeB 2. The eNodeB 3 also receives the PCI identifier, the priority+1 and a timer "timeout3" from the MME entity in the step 14.

In the same way, during the steps 15 to 22, each eNodeB 1 to 3 propagates the proposition with the PCI identifier, a new priority referred to as priority+2 and timers "timeout4" to "timeout11" to respectively several pieces of user equipment 1 to 3, 4 to 5, and 6 to 8.

Then, each piece of user equipment calculates a decision, then sends a response containing this decision as soon as it is calculated, to the eNodeB to which this user equipment is attached. In FIG. 7, the decisions in the steps 23 and 24 reach the eNodeB 1 before the expiry of the "timeout1". On the other hand, the response in the step 25 sent by the user equipment 3 arrives too late, after the expiry of the "timeout1" of eNodeB 1: this response which contains the decision of the user equipment 3 will therefore not be considered. The decisions can be a confirmation "C", a denial "D" or no opinion "N". The eNodeB 3 also receives responses during the steps 26 and 27.

The eNodeB 1 to 3 then calculate their decision that they transmit to the steps 28 to 30 to the MME entity. The latter calculates its decision at every reception of a decision from an eNodeB.

In the step 31, the final decision from the MME entity is sent to the eNodeB4.

The method according to the invention allows the nodes of a network to work with OAM (operation, administration and maintenance) systems while still preserving partial autonomy. Using the method according to the invention with children can substantially reduce the load of the network in such a way that the centralised decision servers no longer require full knowledge of the entire network for each decision to be made. Furthermore, the method according to the invention, a quorum decision method, also allows the child nodes to react very quickly to the deciders, in that the allotted timeframe for the response can be limited and a low number of voters (i.e. low quorum) can be defined.

Of course, the invention is not limited to the examples that have just been described and many modifications can be made to these examples without leaving the scope of the invention. An advantageous application can be considered in the management of a swarm of micro-robots. These micro-robots can be arranged in an entirely distributed configuration. However, it can be imagined to have a supervision micro-robot of which the influence is greater than that of each other micro-robot. This allows the swarm of micro-robots to follow the decision of the hierarchical superior in certain cases, as well as to follow their own decision in other cases, when for example each non-supervisor micro-robot is supposed to have a better knowledge of a given situation with respect to its supervisor.

This invention can therefore apply to the field of robotics and artificial intelligence as well as to the field of autonomous networks.

The invention claimed is:

1. A decision-making process by a decider processing unit, by propagation of a proposition in a distributed network of processing units, with each processing unit being provided with decision intelligence, the process comprising:
    a) determining by the decider processing unit a proposition upon reception of a request,
    b) selecting a set of voter processing units to analyse the proposition and present a response, the response comprising a confirmation of the proposition, a denial of the proposition, or a no opinion response,
    c) defining a percentage weighting for each voter or group of voters selected,
    d) defining a confirmation threshold as a percentage starting from which the proposition is considered as confirmed,
    e) defining a denial threshold as a percentage starting from which the proposition is considered as denied,
    f) triggering a timer and defining at least one processing time, and
    g) during the processing time, according to the responses that the decider processing unit receives, the decider processing unit determines the confirmation response percentage and the denial response percentage, then confirms or denies the proposition by comparing the percentages determined as such with the confirmation and denial thresholds; at the end of the processing time, if no decision has been made, the decider processing unit retrieves all of the available responses and determines the confirmation response percentage and the denial response percentage, then confirms or denies the proposition by comparing the percentages determined as such with the confirmation and denial thresholds;
    wherein each voter or group of voters determines its ability to respond to the proposition and implements its decision-making process if it considers that it can respond within the allotted time or otherwise emit a no opinion response, and/or
    wherein the decider processing unit determines the confirmation response percentage and the denial response percentage by distributing the weighting as a percentage to each voter or group of voters according to their respective weighting as a percentage.

2. The method according to claim 1, wherein the selecting of a set of voters is carried out according to criteria relative to a proximity, a nature of each voter and/or a content of the request.

3. The method as claimed in claim 2, wherein a level of priority is associated with the proposition, and wherein the processing time is specific to the level of priority.

4. The method as claimed in claim 3, wherein at least one voter is configured to apply the steps a) to g) hereinabove to other secondary processing units by considering the same proposition.

5. The method according to claim 4, wherein the proposition submitted to said secondary processing units is assigned a level of priority that is greater than or equal to the level of priority assigned to the proposition.

6. The method as claimed in claim 5, wherein if a voter implements a converging algorithm in order to determine a response, at the end of the processing time that is allotted to it, the voter decides even if the algorithm has not converged.

7. The method as claimed in claim 6, wherein the distributed network is a homogeneous or heterogeneous network.

8. The method as claimed in claim 1, wherein all of the processing units of the distributed network are of identical or different hierarchical levels.

9. A system comprising a plurality of processing units provided with decision intelligence, with the processing units being connected together in a network, with each processing unit being configured as a decider processing unit in order to implement a decision-making process by propagation of a proposition in the network,
    wherein the decider processing unit is configured to:
    a) determine a proposition upon reception of a request, b) select a set voter processing units to analyse the proposition and present a response, the response comprising a confirmation of the proposition, a denial of the proposition, or a no opinion response,
c) define a percentage weighting for each voter or group of voters selected as such,
d) define a confirmation threshold as a percentage starting from which the proposition is considered as confirmed,
e) define a denial threshold as a percentage starting from which the proposition is considered as denied,
f) trigger a timer and define at least one processing time,
g) transmit said proposition with the processing time via the distributed network to all of the voters, and
h) during the processing time, according to the responses that the decider processing unit receives, the decider processing unit determines the confirmation response percentage and the denial response percentage, then confirms or denies the proposition by comparing the percentages determined as such with the confirmation and denial thresholds; at the end of the processing time, if no decision has been made, the decider retrieves all of the available responses and determines the confirmation response percentage and the denial response percentage, then confirms or denies the proposition by comparing the percentages determined as such with the confirmation and denial thresholds;

wherein each voter or group of voters determines its ability to respond to the proposition and implements its decision-making process if it considers that it can respond within the allotted time or otherwise emit a no opinion response, and/or wherein the decider processing unit determines the confirmation response percentage and the denial response percentage by distributing the weighting as a percentage to each voter or group of voters according to their respective weighting as a percentage.

10. A telecommunication equipment provided with decision intelligence and connected in a network to a plurality of processing units, with the equipment being configured as a decider processing unit in order to implement a decision-making process by propagation of a proposition in the network, wherein the decider processing unit is configured to:
a) determine a proposition upon reception of a request,
b) select a set of voter processing units to analyse the proposition and present a response, the response comprising a confirmation of the proposition, a denial of the proposition, or a no opinion response,
c) define a percentage weighting for each voter or group of voters selected as such,
d) define a confirmation threshold as a percentage starting from which the proposition is considered as confirmed,
e) define a denial threshold as a percentage starting from which the proposition is considered as denied,
f) trigger a timer and define at least one processing time,
g) transmit said proposition with the processing time via the distributed network to all of the voters, and
h) during the processing time, according to the responses that the decider processing unit receives, the decider processing unit determines the confirmation response percentage and the denial response percentage, then confirms or denies the proposition by comparing the percentages determined as such with the confirmation and denial thresholds; at the end of the processing time, if no decision has been made, the decider retrieves all of the available responses and determines the confirmation response percentage and the denial response percentage, then confirms or denies the proposition by comparing the percentages determined as such with the confirmation and denial thresholds;

wherein each voter or group of voters determines its ability to respond to the proposition and implements its decision-making process if it considers that it can respond within the allotted time or otherwise emit a no opinion response, and/or wherein the decider processing unit determines the confirmation response percentage and the denial response percentage by distributing the weighting as a percentage to each voter or group of voters according to their respective weighting as a percentage.

11. The telecommunication equipment according to claim 10, wherein the equipment is an MME, an eNode or a UE.

* * * * *